United States Patent
Falken (10) Patent No.: US 11,912,843 B2
(45) Date of Patent: Feb. 27, 2024

(54) RECYCLABLE, BIODEGRADABLE, AND INDUSTRIALLY COMPOSTABLE EXTRUDED FOAMS, AND METHODS OF MANUFACTURING THE SAME

(71) Applicant: O2 Partners, LLC, Amherst, MA (US)

(72) Inventor: Robert Falken, Solana Beach, CA (US)

(73) Assignee: O2 PARTNERS, LLC, Amherst, MA (US)

( * ) Notice: Subject to any disclaimer, the term of this patent is extended or adjusted under 35 U.S.C. 154(b) by 0 days.

(21) Appl. No.: 18/068,115

(22) Filed: Dec. 19, 2022

(65) Prior Publication Data

US 2023/0123482 A1    Apr. 20, 2023

Related U.S. Application Data

(63) Continuation of application No. PCT/US2021/059491, filed on Nov. 16, 2021.

(60) Provisional application No. 63/114,051, filed on Nov. 16, 2020.

(51) Int. Cl.
*C08J 9/30* (2006.01)

(52) U.S. Cl.
CPC ............. *C08J 9/30* (2013.01); *C08J 2203/06* (2013.01); *C08J 2203/08* (2013.01); *C08J 2205/06* (2013.01); *C08J 2367/02* (2013.01); *C08J 2367/04* (2013.01); *C08J 2377/06* (2013.01)

(58) Field of Classification Search
CPC ...... C08J 9/30; C08J 2203/06; C08J 2203/08; C08J 2205/06; C08J 2367/02; C08J 2367/04; C08J 2377/06; B29K 2105/04; B29K 2105/26; B29K 48/022; B29K 48/0012; Y02P 70/62

See application file for complete search history.

(56) References Cited

U.S. PATENT DOCUMENTS

| 5,437,924 A | 8/1995 | Decker, III et al. |
| 8,362,157 B2 | 1/2013 | Wakaki et al. |
| 8,937,135 B2 | 1/2015 | Steinke et al. |

(Continued)

FOREIGN PATENT DOCUMENTS

| CA | 3057542 A1 * | 6/2019 | ........... C07C 231/12 |
| CN | 206678277 U | 11/2017 | |

(Continued)

OTHER PUBLICATIONS

Pradeep, Investigation of Thermal and Thermomechanical Properties of Biodegradable PLA/PBSA Composites Processed via Supercritical Fluid-Assisted Foam Injection Molding, Polymers 2017, 9, 22, p. 1-18. (Year: 2017).*

(Continued)

*Primary Examiner* — K. Boyle (74) *Attorney, Agent, or Firm* — Morgan, Lewis & Bockius LLP (57) ABSTRACT

A process for producing a flexible foam includes introducing a masterbatch material into an extruder, the masterbatch material consisting essentially of one or more thermoplastic polymers that are recycled, recyclable, biodegradable, and/or compostable, mixing an inert gas with the masterbatch material, extruding the masterbatch material through the extruder to form a polymer melt, passing the polymer melt through a die to form an extrudate, and allowing the extrudate to expand into a foam.

19 Claims, 3 Drawing Sheets

(56) References Cited

U.S. PATENT DOCUMENTS

| | | | |
|---|---|---|---|
| 9,610,746 B2 | 4/2017 | Wardlaw et al. |
| 10,316,139 B2 | 6/2019 | Bastioli et al. |
| 10,645,992 B2 | 5/2020 | Le et al. |
| 10,759,096 B2 | 9/2020 | Smith et al. |
| 10,843,429 B2 | 11/2020 | Falken |
| 11,155,009 B2 | 10/2021 | Falken |
| 11,413,799 B2 | 8/2022 | Falken |
| 11,465,377 B2 | 10/2022 | Falken |
| 11,565,448 B2 | 1/2023 | Falken |
| 11,718,055 B2 | 8/2023 | Falken |
| 2002/0002208 A1 | 1/2002 | Martel et al. |
| 2004/0112996 A1 | 6/2004 | Villwock et al. |
| 2005/0127579 A1 | 6/2005 | Suzuki |
| 2008/0050576 A1 | 2/2008 | Pierick et al. |
| 2008/0127527 A1 | 6/2008 | Chen |
| 2009/0270530 A1 | 10/2009 | Nakai et al. |
| 2010/0047550 A1 | 2/2010 | Prissok et al. |
| 2010/0230405 A1 | 9/2010 | Strait, III |
| 2011/0178196 A1 | 7/2011 | Steinke et al. |
| 2012/0225961 A1 | 9/2012 | Van Horn et al. |
| 2013/0203877 A1 | 8/2013 | Uchiyama et al. |
| 2013/0303645 A1 | 11/2013 | Dix et al. |
| 2015/0102528 A1 | 4/2015 | Gunes et al. |
| 2016/0227876 A1 | 8/2016 | Le et al. |
| 2017/0100861 A1 | 4/2017 | Pawloski et al. |
| 2017/0253710 A1 | 9/2017 | Smith et al. |
| 2018/0237605 A1 | 8/2018 | Chang et al. |
| 2018/0362721 A1 | 12/2018 | Chang et al. |
| 2019/0211203 A1 | 7/2019 | Grechi |
| 2020/0079899 A1 | 3/2020 | Bastioli et al. |
| 2020/0094452 A1 | 3/2020 | Baghdadi et al. |
| 2020/0269535 A1 | 8/2020 | Falken |
| 2020/0385573 A1 | 12/2020 | Jiang |

FOREIGN PATENT DOCUMENTS

| | | |
|---|---|---|
| EP | 0952908 | 7/1998 |
| EP | 1266928 A1 | 12/2002 |
| EP | 2514578 A1 | 10/2012 |
| JP | 2006328225 A * | 12/2006 |
| JP | 2011042793 A | 3/2011 |
| JP | 2012-229416 A | 11/2012 |
| WO | 9217533 | 10/1992 |
| WO | 2022/167410 A1 | 8/2022 |
| WO | 2022/167417 A1 | 8/2022 |

OTHER PUBLICATIONS

International Search Report and Written Opinion issued in corresponding International Patent Application No. PCT/US21/59491 dated Mar. 24, 2022, 10 pages.

"Sustainability Report 2019, Consolidated Voluntary Non-Financial Statement Pursuant to Legislative Decree 254/2016," Novamont, retrieved from Internet <https://www.novamont.com/public/Bilancio%20di%20sostenibilit%C3%A0/bds2019_ENG_web_ver2.pdf>.

Ogunsona, Emmanuel et al. "Characterization and mechanical properties of foamed poly(ϵ-caprolactone) and Mater-Bi blends using $CO_2$ as blowing agent," Journal of Cellular Plastics, published Jul. 22, 2014.

Najafi, Naqi et al. "Rheological and foaming behavior of linear and branched polylactides," Rheol Acta (2014) 53:779-790.

Lauzon, Michael. "Novamont boosts bio content in polymer," Plastic News, dated Jun. 19, 2013, retrieved from Internet <https://www.plasticsnews.com/article/20130619/NEWS/130619916/novamont-boosts-bio-content-in-polymer>.

Barrett, Axel. "Mater-Bi® Biopolymers," Bioplastics News, dated Dec. 30, 2013, retrieved from Internet <https://bioplasticsnews.com/2013/12/30/mater-bi-biopolymers/>.

Dippold, Marcel et al. "Influence of pressure-induced temperature drop on the foaming behavior of amorphous polylactide (PLA) during autoclave foaming with supercritical $CO_2$," The Journal of Supercritical Fluids, 190 (2022) 105734.

Marrazzo, Carlo et al. "Foaming of Synthetic and Natural Biodegradable Polymers," Journal of Cellular Plastics, vol. 43, Mar. 2007, pp. 123-133.

* cited by examiner

RECYCLABLE, BIODEGRADABLE, AND INDUSTRIALLY COMPOSTABLE EXTRUDED FOAMS, AND METHODS OF MANUFACTURING THE SAME

CROSS-REFERENCE TO RELATED APPLICATIONS

This application is a continuation of International Patent Application No. PCT/US21/59491 filed Nov. 16, 2021, which claims priority to and the benefit of U.S. Provisional Patent Application No. 63/114,051, filed Nov. 16, 2020, each of which is incorporated herein by reference in its entirety.

FIELD OF THE INVENTION

The present disclosure, according to some embodiments, relates to processes for forming flexible foams from recycled, recyclable, biodegradable, bio-derived, and/or industrially compostable materials. In some embodiments, the present disclosure provides an extrusion process for forming the flexible foams. Foams manufactured in accordance with embodiments of the present disclosure may be useful in a variety of industries and end products, for example, but not limited to, footwear components, seating components, protective gear components, vehicle components, bedding, and watersport accessories.

BACKGROUND

Flexible foams are a type of object formed by trapping pockets of gas in a liquid or solid whereby the resulting foam is said to be flexible due in part to its malleability. Flexible foams are typically used in cushioning applications, for example, footwear, furniture, bedding, and other sporting goods. Flexible foams typically fall into two categories: closed-cell flexible thermoplastic polymer foams and open-cell flexible polyurethane foams. Each of these foam types have very different manufacturing methods.

Closed-cell flexible thermoplastic polymer foams are commonly produced in a dry process in which a suitable synthetic polymer is selected and blended with various chemical additives, crosslinking agents, and chemical blowing agents for producing a "dough." The dough is then kneaded and extruded into flat sheets. The sheets are then stacked on top of each other and placed in a heated press under controlled pressure. This mixture of materials and the chemical blowing agent react and expand inside of the heated press cavity. The result is a closed-cell flexible foam "bun" or "block" that is then slices to thickness. By contrast, open-cell flexible polyurethane foams are commonly produced in a liquid pouring process or liquid molding process in which a man-made polyol chemical, isocyanate chemical, and other chemical additives, are reacted together while being poured or injected into a molded shape, such as a "bun" or "block." The result is an open-cell flexible foam that is then sliced to thickness.

A problem with the presently available flexible foams in the market today is that these foams almost exclusively use non-recyclable and non-compostable materials, and/or environmentally harmful chemicals in their manufacture. Furthermore, due in part to the chemical crosslinking that takes place in the above-described methods of manufacturing conventional flexible foams, the physical structure of those flexible foams cannot be readily recycled or composted. This is due in large part to the chemical compositions of the foam's design and their inability to be separated back into their root precursor constituents. That is, at the end of the conventional flexible foam's life the foam has no further use and cannot be reprocessed into new materials successfully in any known commercially viable methods.

SUMMARY

The present disclosure, according to some embodiments, provides flexible foams and manufacturing processes that may be employed to produce end products that are recyclable, biodegradable, compostable, sustainable, and/or environmentally accountable. In some embodiments, the foam materials and end products are capable of both sustained use, without breakdown, yet are readily recyclable and/or compostable after end of life.

An object of the manufacturing processes disclosed herein, as compared to the more traditional manufacturing processes, is that the manufacturing processes result in environmentally thoughtful end products. By selecting recycled and/or recyclable or biodegradable and industrially compostable feedstocks for producing polymers, embodiments of the present disclosure can contribute to the so-called circular economy and significantly reduce the waste that ends up in landfills every year. In certain preferred embodiments, the flexible foams are derived from recycled materials as well as being recyclable at the end of their usable life. To that end, the selection of environmentally sustainable materials used in the manufacture of said end products should be carefully considered and balanced against the intended performance and useable-life of the end product.

For example, running shoes are highly technical products that are exposed to repeated abuses, including: impact, abrasion, and all manners of environmental exposures over considerable amounts of time, perhaps 1-3 years depending on the frequency of use. When selecting sustainable materials for the use in manufacturing of soles, midsoles, and/or cushioning for insoles of running shoes, it is important to consider the above factors. A material that cannot handle repeated abuse before failure would not produce a satisfactory pair of running shoes. Additionally, any material that has the potential to break-down or weaken to the point of failure during regular product use, prior to the intended end-of-life, would not be acceptable.

In order to address this problem, embodiments of the present disclosure utilize particular materials that provide a balance of technical performance properties as well as sustainability aspects. These sustainability aspects include, for example, properties such as recyclability or composability with a managed end-of-life solution. In some embodiments, the materials used in the present disclosure are net-neutral (or negative) with respect to harmful emissions. End products including the recyclable or compostable flexible foams made in accordance with embodiments of the present disclosure should function very well for the useable life of the product, and only at the end of the products useable life, would the materials have the option to be directed into recycling or compost settings for "closed loop" waste diversion.

In certain embodiments, a process for producing a flexible foam includes introducing a masterbatch material into an extruder, the masterbatch material consisting essentially of one or more thermoplastic polymers that are recycled, recyclable, biodegradable, and/or compostable, mixing an inert gas with the masterbatch material, extruding the masterbatch material through the extruder to form a polymer melt, passing the polymer melt through a die to form an extrudate, and allowing the extrudate to expand into a foam. In some embodiments, the inert gas is nitrogen. In other embodiments, the inert gas is carbon dioxide.

In some embodiments, the one or more thermoplastic polymers is a polyamide or a polyamide copolymer. In some embodiments, the one or more thermoplastic polymers is a polyamide selected from the group consisting of: polyether block amide (PEBA), polyamide 6, polyamide 6/6-6, polyamide 12, or a blend containing one or more thereof. In some embodiments, the one or more thermoplastic polymers comprises a polyesters or a polyester copolymer. In some embodiments, the one or more thermoplastic polymers is a polyester selected from the group consisting of: polybutylene adipate terephthalate (PBAT), polylactic acid (PLA), poly(L-lactic acid) (PLLA), poly(butylene adipate-co-terephthalate) (PBAT), polycaprolactone (PCL), polyhydroxy alkanoate (PHA), polyhydroxybutyrate (PHB), polybutylene succinate (PBS), polybutylene succinate adipate (PBSA), polybutylene adipate (PBA), thermoplastic starch (TPS), and a blend containing one or more thereof. In some embodiments, the one or more thermoplastic polymers is or includes one or more recycled polymer materials. In some embodiments, the one or more thermoplastic polymers comprises of one or more bio-derived polymers (e.g., a bio-derived PBAT).

In some embodiments, the inert gas is mixed with the masterbatch material as a supercritical fluid. In some embodiments, the masterbatch material and the supercritical fluid are mixed to form a single-phase solution. In other embodiments, the inert gas is mixed with the masterbatch material prior to introducing the masterbatch material into the extruder. In some embodiments, the masterbatch material includes pellets of the one or more thermoplastic polymers, and mixing the inert gas with the masterbatch material includes infusing the inert gas into the pellets of the one or more thermoplastic polymers. In some embodiments, infusing the inert gas into the pellets of the one or more thermoplastic polymers causes the pellets of the one or more thermoplastic polymers to expand. In some embodiments, introducing the masterbatch material into the extruder includes introducing the expanded pellets of the one or more thermoplastic polymers into the extruder. In some embodiments, extruding the masterbatch material through the extruder to form a polymer melt includes fusing the expanded pellets of the one or more thermoplastic polymers.

In some embodiments, a process for producing a flexible foam includes providing a plurality of pellets comprising one or more thermoplastic polymers that are recyclable, biodegradable, and/or industrially compostable; expanding the pellets of the one or more thermoplastic polymers by infusing an inert gas into the pellets; introducing the expanded pellets into an extruder; fusing the expanded pellets in the extruder; and extruding the fused expanded pellets through a die using the extruder. In some embodiments, the one or more thermoplastic polymers is or includes a polymer selected from the group consisting of: polybutylene adipate terephthalate (PBAT), polylactic acid (PLA), poly(L-lactic acid) (PLLA), poly(butylene adipate-co-terephthalate) (PBAT), polycaprolactone (PCL), polyhydroxy alkanoate (PHA), polyhydroxybutyrate (PHB), polybutylene succinate (PBS), polybutylene succinate adipate (PBSA), polybutylene adipate (PBA), thermoplastic starch (TPS), and a blend containing one or more thereof. In some embodiments, the one or more thermoplastic polymers is or includes PBAT, PHA, and/or PHB. In some embodiments, the one or more thermoplastic polymers comprises of one or more bio-derived polymers. In some embodiments, the one or more thermoplastic polymers is a recyclable polymer. The inert gas may be, for example, nitrogen or carbon dioxide. In some embodiments, the inert gas is infused in the pellets at saturation pressures ranging from 75 bar to 200 bar, for example, 90 bar to 150 bar. In some embodiments, the inert gas is infused in the pellets at temperatures ranging from 90° C. to 200° C.

In some embodiments, foams made in accordance with processes described herein are recyclable, biodegradable, and/or compostable. In some embodiments, the foams do not include any cross-linking agents. In some embodiments, the foams do not include any cross-linking or cross-linking agents that would prevent the foams from being recycled or biodegraded. In further embodiments, foams made in accordance with processes described herein may be shaped and used in the manufacture of various articles, for example, but not limited to, footwear components (e.g., shoe insoles or midsoles), seating components (e.g., seat cushioning), protective gear components (e.g., padding), vehicle components, bedding components, watersport accessories, or other end products that include foam components.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention can be embodied in different forms and thus should not be construed as being limited to the embodiments set forth herein. The appended drawings may not be drawn to scale.

DETAILED DESCRIPTION

The present disclosure, in some embodiments, provides recyclable, biodegradable, and/or industrially compostable flexible foams and methods of manufacturing the same. Foams according to embodiments of the present disclosure may be closed-cell foams. In other embodiments, foams of the present disclosure may be open-cell foams. In various embodiments, a recyclable, biodegradable, and/or industrially compostable flexible foams can be made to have similar properties and performance characteristics of conventional non-recyclable ethylene vinyl acetate (EVA) foam or thermoplastic polyurethane (TPU), yet contain a high percentage of recycled or bio-derived content. Foams manufactured in accordance with embodiments of the present disclosure may be useful in a variety of industries and end products, for example, but not limited to, footwear components, seating components, protective gear components, vehicle components, bedding, and watersport accessories.

As used herein, "biodegradable" generally refers to a capability of being decomposed by biological activity, in particular, by microorganisms. In some embodiments, materials and foams described in the present disclosure as being biodegradable and/or industrially compostable meet or exceed the requirements set forth in at least one of the following standards: European Standard EN 13432, ASTM D6400, or Australian Standard AS 4736. In some embodiments, materials and foams described in the present disclosure as being biodegradable and/or industrially compostable meet or exceed the requirements set forth in at least European Standard EN 13432. In some embodiments, materials and foams described in the present disclosure as being industrially compostable are configured to demonstrate at least 60% biodegradation (at least 60% of the materials have to be broken down by biological activity) within 180 days of composting in a commercial composting unit. In some embodiments, materials and foams described in the present disclosure as being industrially compostable are configured to demonstrate at least 90% biodegradation within 180 days of composting in a commercial composting unit.

In some embodiments, the term "recyclable" may generally refer to the ability of a material or product to be collected, separated, or otherwise recovered from the waste stream for reuse or use in manufacturing or assembling another item. In some embodiments, polymers and foams described in the present disclosure as being recyclable refers to the ability of the constituent materials to be recovered, for example, by mechanical recycling, chemical recycling, and/or biological or organic recycling. In some embodiments, polymers and foams described in the present disclosure as being recyclable refers to the ability of the constituent materials to be recovered using standard plastic recycling methods, for example, as set forth in ISO 15270:2008. In some embodiments, recycled materials, foams, and/or products described herein may be produced in accordance with the requirements set forth in the Textile Exchange Recycled Claim Standard 2.0 (RCS, Jul. 1, 2017) and/or the Textile Exchange Global Recycle Standard 4.0 (GRS, Jul. 1, 2017).

In some embodiments, a process for forming an extruded flexible foam according to the present disclosure generally includes the steps of: introducing a polymer pellets into an extruder, melting the polymer pellets in the extruder to form a polymer melt, and extruding the polymer melt through a die to form an extrudate. In some embodiments, a foaming agent is introduced into the extruder and allowed to mix with the polymer melt. In some embodiments, the foaming agent is introduced as a supercritical fluid and forms a single-phase solution with the polymer melt. In other embodiments, the polymer pellets are saturated with a blowing agent prior to introducing the polymer pellets into the extruder. As will be described further herein, the polymer pellets are preferably composed of one or more thermoplastic polymers that are recyclable, biodegradable, and/or industrially compostable. In some embodiments, the polymer pellets are composed of a bio-derived thermoplastic polymer. In some embodiments, the polymer pellets are made from recycled plastic materials.

Figure 1:
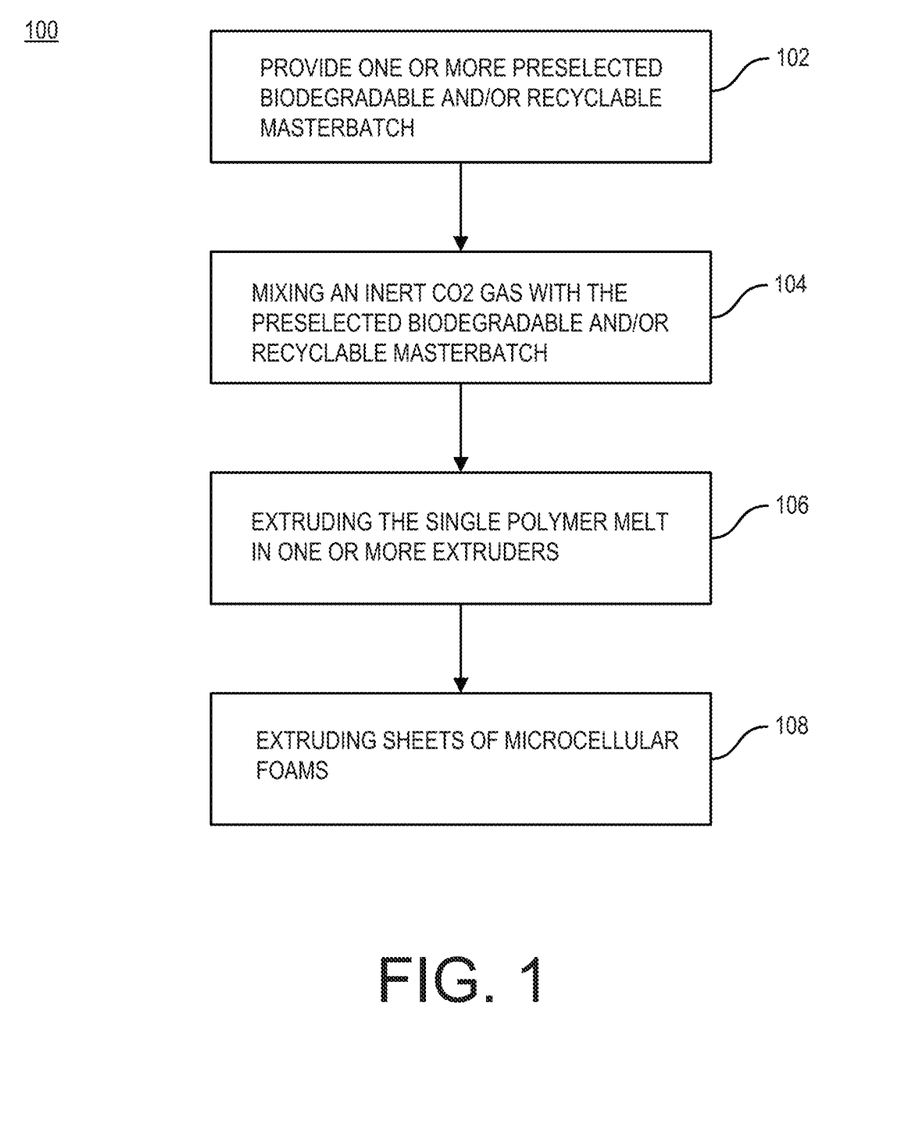
FIG. 1 is a flow chart of a process for forming extruded flexible foams according to some embodiments of the present disclosure.

FIG. 1 a flow chart of a process 100 for forming extruded flexible foams in accordance with certain exemplary embodiments of the present disclosure. At step 102, in some embodiments, process 100 includes providing a masterbatch of one or more preselected materials. The masterbatch, in some embodiments, is composed of a thermoplastic polymer material in the form of pellets, granules, or the like. As noted above, the one or more preselected materials is preferably one or more thermoplastic polymers that are recyclable, biodegradable, and/or industrially compostable according to some embodiments. In some embodiments the one or more preselected materials is derived from recycled plastic waste materials. In some embodiments, the masterbatch consists entirely of one or more preselected biodegradable materials (e.g., biodegradable thermoplastic polymers). In some embodiments, the masterbatch consists entirely of one or more preselected recyclable materials (e.g., recyclable thermoplastic polymers).

At step 104 of process 100, an inert gas is mixed with the masterbatch. In some embodiments, the inert gas (e.g., a foaming agent) is mixed with the masterbatch in one or more extruders. The inert gas may be mixed with the masterbatch as a supercritical fluid in some embodiments. In some embodiments, the masterbatch is melted and forms a single-phase solution with the supercritical fluid. In other embodiments, the masterbatch is saturated with an inert gas (e.g., a blowing agent) before introducing the masterbatch into the one or more extruders.

In some embodiments, saturating the pellets of the masterbatch with the inert gas infuses the pellets with a portion of the gas, and causes the pellets to at least partially expand. In some embodiments, saturating the masterbatch with the inert gas forms puffed (expanded) or at least partially puffed polymer pellets which can then be fused together (e.g., via extrusion). In some embodiments, puffed (expanded) polymer pellets have a size from 4 mm to 10 mm (e.g., in a broadest dimension). In some embodiments, the puffed (expanded) polymer pellets have a bulk density from about 100 kg/m$^3$ to about 200 kg/m$^3$. In some embodiments, the polymer pellets have an expansion ratio in the range of about 1.5 to about 4.5. In some embodiments, the inert gas saturation pressures can range from 75 bar to 200 bar, for example, 90 bar to 150 bar. In some embodiments, the inert gas saturation temperatures can range from 90° C. to 200° C., depending on the specific biodegradable, industrially compostable, and/or recycled and/or recyclable polymers drop point and melt temperatures. Furthermore, in some embodiments, the mean pore size and cell density of the foam is controllable to a certain degree with the adjustment of the saturation pressure. In some embodiments, a high inert gas saturation pressure is preferred for obtaining small mean pore size and high cell density. In yet further embodiments, the polymers may optionally pre-dried and dehumidified prior to foaming. In some embodiments, for example, pre-drying conditions are in the range of 65-85° C. for 4-6 hours with a dew point of −40° C. and less than 0.05% relative humidity.

At step 106, the masterbatch, mixed with the gas, forms a polymer melt that is extruded through the one or more extruders. The one or more extruders may be, for example, screw extruders having one or more extrusion screws for compressing and conveying the polymer melt. At step 108, the polymer melt is extruded into sheets of microcellular foams. In some embodiments, the polymer melt is extruded through a die configured to shape the extrudate. In some embodiments, as the polymer melt is extruded through the die, the gas mixed within the polymer melt is allowed to expand, resulting in a flexible foam. In further embodiments, the flexible foam can then be cut and/or shaped (e.g., via compression molding) into any desired configuration.

The present subject matter will now be described more fully hereinafter in which representative embodiments are described. The present subject matter can, however, be embodied in different forms and should not be construed as being limited to the specific embodiments set forth herein. Rather, these embodiments are provided to describe and enable one of skill in the art.

Thermoplastic Polymers

In some embodiments, creating microcellular extrusion foams from recycled and/or recyclable thermoplastic polymers or, alternatively, bio-derived thermoplastic polymers begins with selecting a suitable high-performance polymer. Suitable thermoplastic polymers that may be utilized according to embodiments of the present disclosure should preferably include the following characteristics: produces foams with low density, has moderate melt flow rates, produces high elongation when foamed, and is 100% recyclable and/or 100% industrial compostable. In some non-limiting examples, a suitable thermoplastic polymer will produce a foam having a density from 0.15 g/cc to 0.35 g/cc, preferably from 0.20 g/cc to 0.25 g/cc. In some non-limiting examples, a suitable thermoplastic polymer will have a melt flow rate ranging from 5 g/10 min to 30 g/10 min, preferably 10 g/10 min to 20 g/10 min. In other examples, the melt flow rate may range from 7 g/10 min to 15 g/10 min. In some non-limiting examples, a suitable thermoplastic polymer produce foamed elongation ranging from 150% to 800%, preferably from 250% to 450%. In some embodiments, the thermoplastic polymer may be supplied in the form of solid pellets that are sized and configured to be fed into an extruder. The plurality of pellets of the polymer material to be fed into the extruder may also be referred to herein as a "masterbatch."

In some embodiments, a thermoplastic polymer used to manufacture the recyclable, biodegradable, and/or industrially compostable flexible foams of the present disclosure can be selected from any number of polyamides or polyamide copolymers. Non-limiting examples of suitable polyamide polymers include polyether block amide (PEBA), polyamide 6, polyamide 6/6-6, polyamide 12, and blends containing one or more thereof. A non-limiting example of a suitable recycled and/or recyclable polymer is a PEBA manufactured by Nylon Corporation of America, Manchester, NH.

In some embodiments, a thermoplastic polymer used to manufacture the recyclable, biodegradable, and/or industrially compostable flexible foams of the present disclosure can be selected from any number of polyesters or polyester copolymers, preferably a bio-derived polyester. Non-limiting examples suitable polyester polymers include polybutylene adipate terephthalate (PBAT), polylactic acid (PLA), poly(L-lactic acid) (PLLA), poly(butylene adipate-co-terephthalate) (PBAT), polycaprolactone (PCL), polyhydroxy alkanoate (PHA), polyhydroxybutyrate (PHB) polybutylene succinate (PBS), polybutylene succinate adipate (PBSA), polybutylene adipate (PBA), thermoplastic starch (TPS), and blends containing one or more thereof. In some embodiments, the thermoplastic polymer selected for the recyclable, biodegradable, and/or industrially compostable flexible foams of the present disclosure includes or consists entirely of PBAT. In some embodiments, the thermoplastic polymer selected for the recyclable, biodegradable, and/or industrially compostable flexible foams of the present disclosure includes or consists entirely of PHA.

In some embodiments, recycled feedstocks are employed to produce the suitable recyclable polymer or polymer blends of the present disclosure. It is an object of certain embodiments to use recycled polymer feedstocks whenever possible. An example of using recycled feedstocks, according to some embodiments, is to use post-industrial polyamide carpet fiber, collected ocean plastic fishing nets, or other plastic waste materials that are collected, sorted, melted down, and reprocessed. In some such examples, the collected waste materials can be reprocessed into virgin-quality polyamide precursors (e.g., caprolactam). An exemplary caprolactam derived from post-industrial carpet fiber and used fishing nets is Econyl manufactured by the Aquafil USA Inc., Cartersville, Georgia. The aforementioned thermoplastic polymer resin has shown advantageous technical properties in forming the optimal microcellular flexible foam structure according to embodiments of the present disclosure. Some of these technical properties include exceptional aging properties, excellent elongation, tensile strength, and compression set, among other benefits.

Still further, in some embodiments, a bio-derived polymer is used to produce the flexible foams of the present disclosure. In some embodiments, the terms "bio-derived" or "bio-polymer" or "bioplastic" may be used herein to refer to polymers that are derived from biological sources (e.g., as opposed to petroleum-based sources) or are made from precursor materials (e.g., monomers) that are derived from biological sources. In some such embodiments, the biological source may be a renewable plant source. One non-limiting example of a suitable bio-polymer for use in the present disclosure is a bio-derived PBAT manufactured by Novamont SpA, Novara, Italy. This bio-derived PBAT is both biodegradable and industrially compostable, wherein the polymer's precursors, namely azelaic acid and bio-derived biobutanediol (bio-BDO) make up the primary bio-derived nature of the polymer. This bio-derived PBAT demonstrates overall advantageous technical properties in forming the optimal microcellular flexible foam structure according to embodiments of the present disclosure. Some of the enhanced technical properties include exceptional aging properties, excellent elongation, tensile strength, and compression set, among other benefits. In addition to plants, in some embodiments the biological source of the "bio-derived" or "bio-polymer" or "bioplastic" material(s) includes, for example, microorganisms (e.g., bacteria), algae, animal (e.g., animal fats/lipids), and/or insects.

In some embodiments, blends of two or more thermoplastic polymers can be utilized. In some embodiments, the blends of two or more thermoplastic polymers can provide a combination of properties not found in a single polymer. There are a number of ways to blend polymers together successfully. One such method is to use a twin-screw extruder to melt two or more polymer resins together and to then extrude the molten polymer resin blend into a strand that is cooled and fed into a pelletizer for producing an array of pelletized pieces called a masterbatch. Another method of polymer blending is to use compatibilizing agents to join unlike polymers together in a polymer blend. This method may also use twin-screw extrusion or the like to melt the compatibilizing agent and two or more polymers together to form the blend.

Additives

In certain embodiments, depending on the application, one or more additives may be optionally added to the polymer formulations. The one or more additives can include, for example, one or more fillers, nucleating agents, and/or colorants. In some embodiments, the one or more additives may be included to adjust the physical and/or chemical properties of the resulting foams. Preferably, in some embodiments, the one or more additives includes or consists of recyclable and/or compostable materials. In some embodiments, one or more biodegradable and/or recyclable binding agents (binders) are optionally included to assist with fusing the puffed pellets together. In some embodiments, the one or more additives may be added to the polymer prior to extrusion (e.g., mixed with the masterbatch). In some embodiments, the one or more additives may additionally or alternatively be added into the extruder and mixed with the polymer in the extruder (e.g., via side in-feeding into the extruder).

In some embodiments, one or more fillers may optionally be added to the polymer to reduce part cost. For example, in some embodiments, the one or more fillers may have lower cost per weight than the polymer material and be used to add physical bulk to the product and/or improved specific properties. In some non-limiting examples, the one or more fillers, when included, may be added in a range of 1% to 30% in load weight ratio. The one or more fillers may include, for example, precipitated calcium carbonate, oolitic aragonite, starches, biomass, or the like. In some embodiments, the materials for the one or more filler are selected such that the flexible foams and/or end products remain recyclable and/or compostable.

Nucleating agents, for example, micro-lamellar talc or high aspect ratio oolitic aragonite, may be included in some embodiments. Nucleating agents, in certain embodiments, can greatly improve key properties of the resulting flexible foam by preventing cellular coalescence (e.g., the merging of gas bubbles), lowering bulk density, and improving rebound resilience, among other beneficially enhanced attributes. In some such embodiments, the nucleating agent improves foaming by increasing the amount of individual gas bubbles in the foam material. Several non-limiting examples of nucleating agents for use in producing flexible foams include micro-lamellar talc marketed as Mistrocell® by Imerys Talc America Inc., Houston, Texas and high aspect ratio oolitic aragonite marketed as OceanCal® by Calcean Minerals & Materials LLC, Gadsden, Alabama. In some non-limiting examples, the one or more nucleating agents, when included, may be added in a range of 0.1% to 10% in load weight ratio.

In further embodiments, one or more additives may be included that are configured accelerate and/or improve the biodegradation of the finished foam product. In one example, oligomeric poly(aspartic acid-co-lactide) (PAL) may be optionally compounded into the masterbatch for accelerating biodegradation as appropriate in certain instances and for specific end-market uses.

In some embodiments, one or more colorants may optionally be included in order to change the color of the resulting flexible foam. For instance, various colorants such as dyes or pigments may optionally be included in the polymer formulations of the present invention. Several non-limiting examples are pigments that have been tailor-made for specific types of thermoplastic polymer use, for example, pigments offered by Treffert GmBH & Co. KG, Bingen am Rhein, Germany or those offered by Holland Colours Americas Inc., Richmond, Indiana. In some non-limiting examples, the one or more colorants, when included, may be added in a range of 0.1% to 5% in load weight ratio.

Foaming and Blowing Agents

In order to produce a foam according to certain processes of the present disclosure, the polymer formulations are mixed with a foaming agent. A widely known foaming agent used in conventional manufacturing processes is azodicarbonamide (ADA). ADA is typically pre-impregnated into conventional thermoplastic masterbatch resins for use in conventional injection molding foam processes. However, ADA is not considered environmentally friendly, and is a suspected carcinogen to human health. Moreover, conventional foaming processes using ADA typically produce foams which are cross-linked during the manufacturing process and therefore are not recyclable or compostable. Therefore, in preferred embodiments, processes of the present disclosure do not use ADA.

In some embodiments, an inert gas is used as a foaming agent for foaming processes of the present disclosure. In some embodiments, the foaming agent used in embodiments of the present disclosure is either nitrogen gas ($N_2$) or carbon dioxide ($CO_2$). In some embodiments, the foaming agent is mixed as a supercritical fluid (SCF) with the polymer material. In some embodiments, the SCF and polymer material forms a single-phase solution. In some embodiments, the foaming processes of the present disclosure includes passing a single-phase solution of polymer and supercritical fluid (SCF) through the extruder die to form an extrudate in a continuous form. In some embodiments, the extrudate has an annular shape. In some embodiments, the extrudate is formed into flat sheets. Other shapes are also possible according to other embodiments. In some embodiments, homogeneous cell nucleation occurs when a single-phase solution of polymer and supercritical fluid (SCF) passes through the extruder die. In some embodiments, as the solution exits the extruder die, the pressure drops, which in turn causes the SCF to come out of solution creating, cell nuclei. The cells then grow until the material expands, and the expansion capabilities of the SCF are expended, thereby stabilizing the resulting foam. As will be described further herein, processes according to some embodiments may be run on extrusion machines that have been modified to allow the metering, delivery, and mixing of the inert SCF into the polymer to create the single-phase solution.

Differences in the effectiveness of nitrogen and carbon dioxide as foaming agents stem from their behavior in the polymer melt. Carbon dioxide, which becomes an SCF fluid at temperatures and pressures higher than its critical point (about 31° C. and about 73 bar), is 4 to 5 times more soluble in polymers than nitrogen, which becomes a supercritical fluid at about −147° C. and about 34 bar. For example, the saturation point in an unfilled polymer is about 1.5 to 2 percent by weight of nitrogen, depending on temperature and pressure conditions, while the saturation level of carbon dioxide is closer to 8 percent by weight. Carbon dioxide also exhibits a greater mobility in the polymer, allowing it to migrate further into existing bubbles than nitrogen. From the perspective of cell nucleation, greater solubility and mobility means fewer cells will be nucleated, and those that do nucleate will tend to be larger.

Solubility, however, becomes an advantage according to certain embodiments when the goal is viscosity reduction. In some embodiments, lower viscosity may be beneficial for lower part weights. In some embodiments, an SCF dissolved in a polymer acts as a plasticizing agent, reducing the viscosity of the polymer. Because viscosity reduction is partly a function of the amount of SCF added to the polymer, and because carbon dioxide has a higher solubility limit than nitrogen, the ability to reduce viscosity with carbon dioxide is greater.

Carbon dioxide is also preferred as the foaming agent, in some embodiments, when the amount of nitrogen needed to produce a part is so low that it is not possible to consistently process parts. In some embodiments, given that carbon dioxide has a higher solubility in the polymer than nitrogen, there are times where it is easier to run low levels of carbon dioxide, 0.15 or 0.2 percent, as compared to very low levels of nitrogen, less than 0.05 percent. This occurs primarily with soft materials and parts with thick cross sections.

In some alternative embodiments, one or more blowing agents are used for pre-expanding pre-foamed pellets of the polymer materials. In some embodiments, the blowing agent is an inert gas. In some such embodiments, the blowing agent may be either nitrogen or carbon dioxide. In some embodiments, the pre-expansion infuses a gas (e.g., nitrogen or carbon dioxide) into the polymer pellets, thereby forcing their individual expansion to form a pre-foamed puffed pellet. In some embodiments, these pre-foamed pellets are then extruded into continuous sheets in varying thicknesses and lengths to meet a given need. The finished fused sheets of pellets are the result of the fusion of each individual pre-foamed pellet into a plurality of foamed and fused pellets. The finished homogeneous sheet is then ready for die cutting or molding by conventional means such as those known in the art.

Extrusion System

According to some aspects, the present disclosure provides a system for producing a recyclable, biodegradable, and/or industrially compostable flexible foam. In various embodiments, the system may include one or more of the following components: at least one extruder configured for melting and conveying the polymer material, a hopper configured to introduce the polymer material (e.g., in the form of pellets) into the extruder, and a die for shaping the material extruded by the extruder. In some embodiments, the aforementioned components may be combined in a single apparatus. In some embodiments, a system according to the present disclosure further includes a gas source configured to supply a foaming agent or blowing agent (e.g., nitrogen or carbon dioxide) to be mixed with the polymer material. In some embodiments, the system further includes a control system configured to control various process parameters of the extrusion system, for example, but not limited to, one or more of temperature, pressure, polymer feeding rate, gas dosing, or extrusion speed.

In some embodiments, the at least one extruder may be a screw extruder. In some such embodiments, the screw extruder includes a barrel and at least one screw disposed within the barrel and configured to rotate therein. In some embodiments, the at least one screw is configured to compress, melt, and convey the polymer material introduced into the extruder. In some embodiments, a hopper may be included for feeding the polymer masterbatch (e.g., pelletized polymer material) into the barrel of the extruder. In some embodiments, the polymer masterbatch may be gravity-fed from the hopper through a throat of the hopper into the barrel and screw assembly of the extruder.

In some embodiments, the at least one screw may be driven by one or more motors. In some embodiments, the screw extruder is a multiple-screw extruder having more than one rotating screw. In some such embodiments, the screw extruder may be a twin-screw extruder having a pair of parallel screws that are intermeshed. In further embodiments, the screw may be a reciprocating screw. The reciprocating screw may include three zones: the feeding zone, the compressing (or transition) zone, and the metering zone. In some embodiments, a system includes at least two extruders. In some embodiments, a system includes a first, melt extruder that feeds material into a second, cooling extruder.

In some embodiments, a nozzle may be present, where the nozzle connects the barrel of an extruder to a die and forms a seal between the barrel and the die. In some embodiments, the temperature of the nozzle may be set to the polymer material's melt temperature or just below it. In some embodiments, the die includes a sprue bushing and the nozzle connects to the sprue bushing. In some embodiments, a delivery system may also be included. The delivery system, in some embodiments, provides a passage for the molten polymer from the nozzle to the die and may generally include a sprue, cold slug wells, a main runner, branch runners, gates, and the like. In some embodiments, when the barrel is in its full forward processing position, the radius of the nozzle may nest and seal in the concave radius in the sprue bushing with a locating ring. During purging (cleaning) of the barrel, the barrel may back-out from the sprue, so the purging compound can free fall from the nozzle.

In a further aspect, the system may additionally include a supercritical fluid (SCF) dosing system configured for receiving a gas (e.g., nitrogen or carbon dioxide) and introducing the received gas into the barrel of the extruder under conditions so as to produce a supercritical fluid upon said introduction. In some embodiments, the supercritical fluid dosing system may be configured to alter the pressure and/or temperature of the received gas to be beyond the gas' critical point. In some embodiments, for example, the SCF dosing system may include a supply of gas (e.g., nitrogen or carbon dioxide), an air compressor, an SCF metering and control device, SCF injector, and front and back non-return valves. In some embodiments, the supercritical fluid mixes with the thermoplastic polymer within the barrel of the extruder. In some embodiments, the supercritical fluid and the thermoplastic polymer form a single-phase solution within the barrel of the extruder. In some embodiments, the creation of the single-phase solution, in which the SCF is fully dissolved and uniformly dispersed in the molten polymer, takes place inside the extruder barrel under carefully controlled process conditions. In some embodiments, the SCF should be accurately mass flow metered into the polymer for a fixed amount of time, and during that dosing period, specific conditions of temperature, pressure and shear must be established within the barrel. In some embodiments, back-pressure, screw-speed and barrel-temperature control, as well as the SCF dosing system all play a role in establishing the process conditions that create the single-phase solution.

In some embodiments, process set-up procedures revolve around establishing a controlled SCF dosing into the extrusion barrel under screw speed, temperature, and pressure conditions that result in a single-phase solution. In some embodiments, one or more of the following system parameters may adjusted to ensure that basic conditions of SCF dosing are met:

1) SCF Saturation Pressure: In some embodiments, the effects of the inert gas saturation pressure and saturation temperature play a major role in the expansion ratio of the foam. In some non-limiting examples, saturation pressures can range from 75 bar to 200 bar, and preferably 90 bar to 150 bar. Inert gas saturation temperatures can range, for example, from 90° C. to 200° C., depending on the specific biodegradable, industrially compostable, and/or recycled and/or recyclable polymers drop point and melt temperatures. Furthermore, the mean pore size and cell density of the foam is controllable to a certain degree with the adjustment of the saturation pressure (the pressure of the inert gas saturation into the chosen polymer). A high inert gas saturation pressure is preferable in some embodiments for obtaining small mean pore size and high cell density. The effects of the inert gas saturation pressure and saturation temperature play a major role in the expansion ratio of the foam.

2) SCF Injector Open Position: this setpoint sets the screw position at which the SCF dosing starts. The position should be set so that the pressure in the barrel during screw recovery has become stable prior to the start of dosing. As a non-limiting example, the open position could be in the range of 0.3 and 0.4 inches.

3) SCF Percent: this controls the actual mass of SCF dosed. A non-limiting example of the SCF percent could be in the range of 0.45% and 0.75%, and more preferably 0.5%.

4) Dosing Optimization: This is accomplished by maximizing the dosing time and minimizing the flow rate (pressure difference between the pre-metering pressure and the delivery pressure). A non-limiting example of the dosing time is between 1-2 seconds, and more preferably 1.7 seconds. In some embodiments, the single polymer melt is nucleated within the die and is released at the outlet of the die as a single polymer melt stream whereby the release time is preferably a fraction of a fraction of a second.

In some embodiments, once the single-phase solution has been created, the extruder maintains the solution in a pressurized state until the start of extrusion. In some embodiments, extruder does so through the combined efforts of a pressure regulator valve and melt pump control. In some embodiments, the pressure regulator valve prevents depressurization and premature foaming into the die element. In further embodiments, either active or passive screw position control may be utilized to prevent depressurization through the backward movement of the screw. According to some such embodiments, during active screw position control, the position of the screw is continuously monitored, and the pressure applied to the back of the screw is adjusted to maintain a position setpoint or a constant pressure is held on the back of the screw. In passive position control, an oil may be used to regulate back pressure and is prevented from draining to its tank at the end of screw recovery. This residual oil keeps the screw from moving backward due to the pressure of the single-phase solution.

In some embodiments, a system of the present disclosure may further include one or more temperature sensors configured for monitoring and/or controlling the temperature within the barrel or other components of the system. In some embodiments, the system may include one or more pressure sensors configured for monitoring and/or controlling the pressure within the barrel or other components of the system. Additionally, a control unit having one or more microprocessors may be included, the control unit being configured for controlling one or more of the extruder and the supercritical gas dosing system, in accordance with one or more system parameters. In some embodiments, a control system may be configured to provide consistency and repeatability in the extruder operation. In some embodiments, the control system monitors and controls the processing parameters, including the temperature, pressure, SCF dosing, injection speed, screw speed and position, and hydraulic position. The control system can range from a simple relay on/off control to an extremely sophisticated microprocessor-based, closed-loop control.

In some embodiments, the system and/or any sub-systems thereof may include one or more sensors, for example, temperature sensor, pressure sensor, accelerometer, gyroscope, and an orientation sensor. In some embodiments, the one or more sensors are configured to be positioned in communication with one or more of the other components of the extrusion system, such as within the extruder, die, etc. In various embodiments, the one or more sensors may be smart sensors and include a communications module configured to connect to a network. In some embodiments, the communications module may be further configured to perform wireless communications. In some embodiments, the system, and/or any of its various parts may include a communications module that may be coupled to one or more of the control system, the SCF dosing system, and the gas counterpressure control unit, such as where the communications module is configured for performing one or more wireless communications protocols including WIFI, Bluetooth, Low Energy Blue Tooth, and 3G, 4G, and 5G cellular communications.

Figure 2:
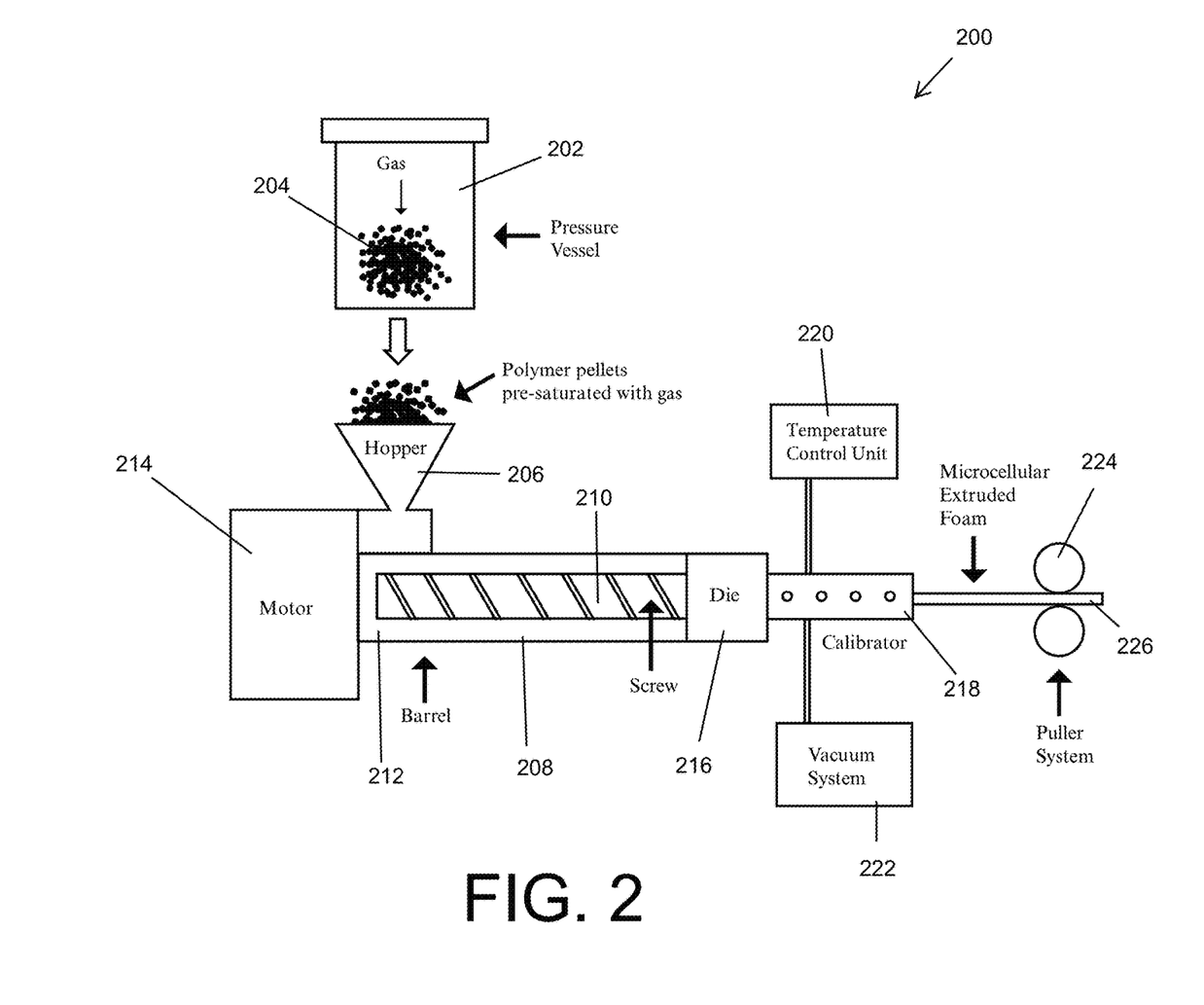
FIG. 2 is a diagram illustrating a system for forming extruded flexible foams according to some embodiments of the present disclosure.

FIG. 2 illustrates a system 200 for producing a flexible foam according to one non-limiting example. In some embodiments, in a first stage, system 200 includes a pressure vessel 202 configured for containing pellets of a masterbatch 204. The pellets may be composed of any one or more of the non-limiting examples of thermoplastic polymer materials described above. For example, the pellets may consist entirely of one or more recyclable thermoplastic polymers, or may consist entirely of one or more biodegradable thermoplastic polymers (e.g., one or more bio-polymers). In some embodiments, the pellets of masterbatch 204 may be infused or saturated with an inert gas (e.g., carbon dioxide or nitrogen) within pressure vessel 202.

In some embodiments, the effects of the inert gas saturation pressure and saturation temperature (e.g., within pressure vessel 202) play a major role in the expansion ratio of the foam. In some embodiments, saturation pressures can range from 75 bar to 200 bar, and preferably 90 bar to 150 bar. Inert gas saturation temperatures can range from 90° C. to 200° C., depending on the specific biodegradable, industrially compostable, and/or recycled and/or recyclable polymers drop point and melt temperatures. Furthermore, the mean pore size and cell density of the foam is controllable to a certain degree with the adjustment of the saturation pressure—the pressure of the inert gas saturation into the chosen polymer. A high inert gas saturation pressure is ideal for obtaining small mean pore size and high cell density.

In some embodiments, in a second stage following saturation with the inert gas, the pellets of masterbatch 204 are transferred to a hopper 206 that is configured to feed the pellets into an extruder 208. The pellets may be in an expanded state after saturation with the inert gas. In some embodiments, extruder 208 includes one or more extrusion screws 210 that are housed and configured to rotate within a barrel 212. The rotation of the one or more extrusion screws 210 may, for example, be driven by a motor 214. In some embodiments, the one or more extrusion screws 210 are configured to convey, compress, and fuse the saturated pellets of masterbatch 204 together as the pellets are extruded through extruder 208, forming a polymer melt. In some embodiments, one or more biodegradable and/or recyclable binding agents (binders) are optionally included to assist with fusing the pellets together.

In some embodiments, the polymer melt is extruded by extruder 208 through a die 216. The die 216, in some embodiments, may be positioned at an end of extruder 208 and is configured to shape the polymer melt as it passes through die 216. In some embodiments, the temperature of die 216 is set to the polymer material's melt temperature or just below it. In some embodiments, the polymer melt is extruded through die 216 and passes through a calibrator 218. In some embodiments, calibrator 218 is configured to cool the extrudate following extrusion through the die. In some embodiments, the calibrator 218 is connected to a temperature control unit 220 (e.g., Thermolator® brand temperature control unit). In some embodiments, the temperature control unit 220 is configured to control the temperature of calibrator 218. In some embodiments, the calibrator 218 and/or temperature control unit 220 is configured to sufficiently cool the extrudate as it passes through calibrator 218 in order to solidify the extrudate.

In further embodiments, calibrator 218 is connected to a vacuum system 222. In some embodiments, vacuum system 222 is configured to create a low-pressure zone. As the polymer melt exits die 216 and is exposed to the low-pressure zone, the gas that was incorporated into the polymer melt expands, forming the extruded foam 226. In further embodiments, a puller system 224 may be included to convey the extruded foam 226 away from die 216. Puller system 224 may include, for example, one or more rollers configured for receiving extruded foam 226. In some embodiments, the rollers of the puller system assist with shaping the extruded foam 226 (e.g., into a flat sheet).

Figure 3:
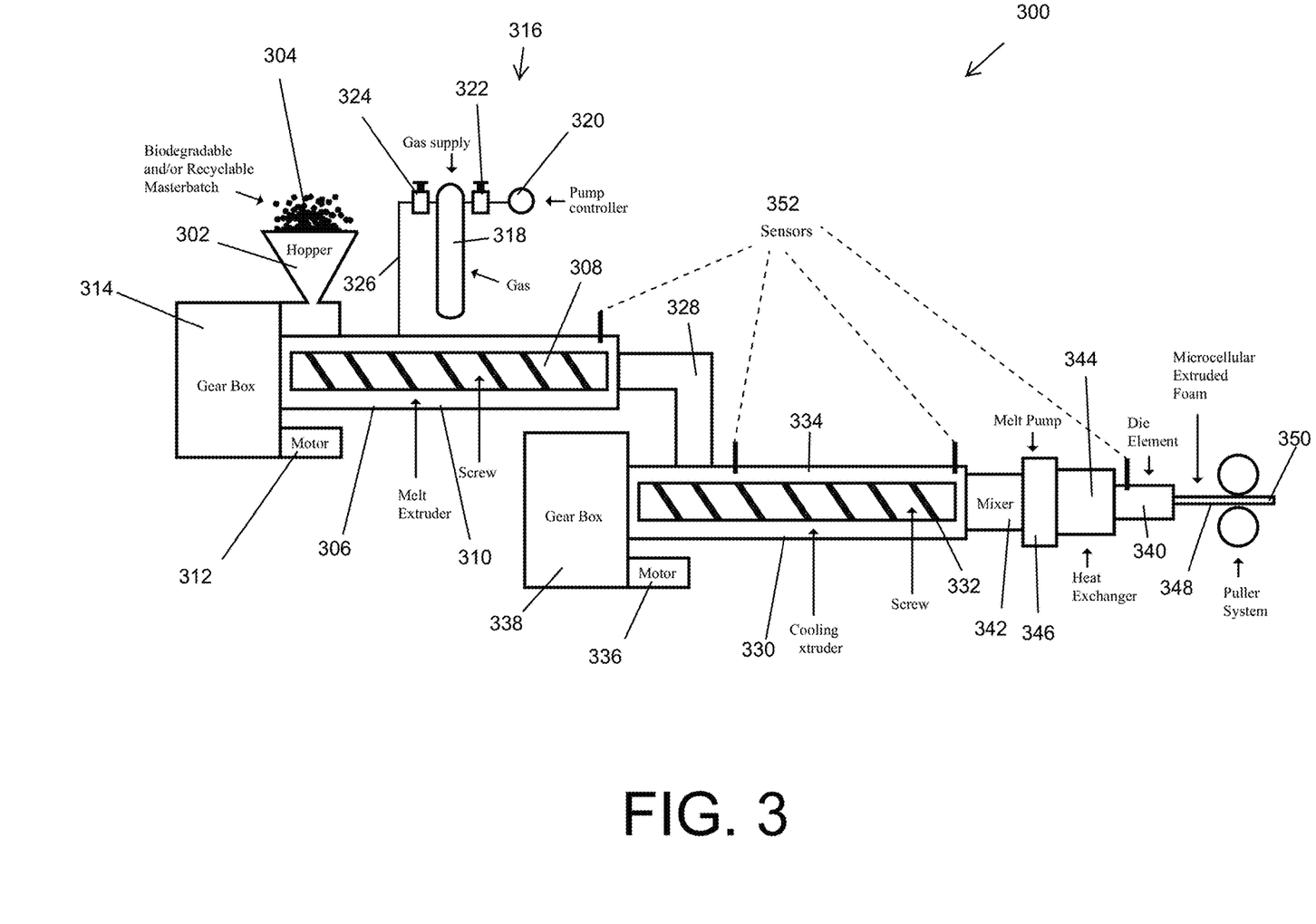
FIG. 3 is a diagram illustrating another system for forming extruded flexible foams according to further embodiments of the present disclosure.

FIG. 3 illustrates a system 300 for producing a flexible foam according to another non-limiting example. In some embodiments, system 300 includes a hopper 302 that is configured to feed the pellets of a masterbatch 304 into a first extruder 306. The pellets may be composed of any of the non-limiting thermoplastic polymer materials described above. In some embodiments, first extruder 306 is a melt extruder. In some embodiments, first extruder 306 includes one or more extrusion screws 308 that are housed and configured to rotate within a barrel 310. The rotation of the one or more extrusion screws 308 may, for example, be driven by a first motor 312 connected to extrusion screws 308 by a system of gears 314. In some embodiments, the one or more extrusion screws 308 are configured to convey, compress, and melt the pellets of masterbatch 304 as the pellets are extruded through first extruder 306, forming a polymer melt.

System 300, in some embodiments, includes a supercritical fluid (SCF) dosing system 316 configured to deliver an inert gas into first extruder 306 to be mixed with the polymer melt. In some such embodiments, SCF dosing system 316 includes, for example, one or more of a supply (e.g., tank) 318 of an inert gas (e.g., nitrogen or carbon dioxide), a pump controller 320, valves 322, 324 for controlling the flow of the inert gas, and an injection line 326 for injecting the inert gas into first extruder 306. In some embodiments, SCF dosing system 316 is configured to introduce the inert gas into first extruder 306 as a supercritical fluid. In some such embodiments, SCF dosing system 316 is configured to inject the inert gas into first extruder at a pressure and temperature that is above the gas' critical point. For example, in some embodiments, the SCF dosing system 316 is configured to introduce the supercritical fluid at a pressure ranging from about 150 bar to about 300 bar, and a temperature from about 150° C. to about 350° C. In some embodiments, the SCF dosing system 316 is configured to introduce the supercritical fluid at a pressure ranging from about 90 bar to about 150 bar, and a temperature from about 90° C. to about 200° C. In some embodiments, the pressure and temperature within first extruder 306 is sufficient to maintain the inert gas in its supercritical state.

In some embodiments, the supercritical fluid and polymer melt are mixed within first extruder 306 to form a single-phase solution. In some embodiments, the single-phase solution is extruded from first extruder 306 and into a second extruder 330 via a pipe 328. In some embodiments, second extruder 330 is a cooling extruder. In some embodiments, the use of second extruder 330 helps to avoid foam cell collapse and shrinkage. In further embodiments, the use of second extruder 330 aids in producing a smooth and homogenous foam structure. In some embodiments, second extruder 330 includes one or more extrusion screws 332 that are housed and configured to rotate within a second barrel 334. The rotation of the one or more extrusion screws 332 may, for example, be driven by a second motor 336 connected to extrusion screws 332 by a second system of gears 338. In some embodiments, the one or more extrusion screws 332 are internally cooled (e.g., via water, oil, or other coolant). In some such embodiments, cooling of the one or more extrusion screws 332 may prevent the polymer material being extruded through second extruder 330 from sticking to the one or more extrusion screws 332.

In some embodiments, second extruder 330 is configured to convey and extrude the polymer melt to through a die 340. Die 340, in some embodiments, is configured to shape the polymer melt as it passes through die 340. In some embodiments, system 300 includes a mixer 342 disposed between second extruder 330 and die 340. In further embodiments, system 300 includes a heat exchanger 344 disposed between second extruder 330 and die 340. In yet further embodiments, system 300 includes a melt pump 346 disposed between second extruder 330 and die 340. In some embodiments, melt pump 346 is configured to precisely control the output of die 340. In some such embodiments, melt pump 346 includes a suction side that receives the extruded material from second extruder 330 and a discharge side that outputs the extruded material to die 340. In some embodiments, the extruded material passes through mixer 342 from second extruder 330 to melt pump 346. In some embodiments, melt pump 346 is configured to output the extruded material to die 340 at a more consistent pressure and volume. In some embodiments, heat exchanger 344 is configured to help regulate the temperature of second extruder 330, melt pump 346, and/or die 340. In some embodiments, as the polymer melt exits die 340, the gas that was incorporated into the polymer melt expands, forming the extruded foam 350. In some embodiments, a puller system 348 may be included to convey the extruded foam 350 away from die 340.

In some embodiments, system 300 may further include one or more sensors 352 coupled to various components of the system. The one or more sensors 352 may include, for example, pressure sensors, temperature sensors, or the like, that are configured to measure various operating parameters of the components. The one or more sensors 352 may be coupled, for example, to one or more of the first extruder 306, the second extruder 330, and the die 340. In some embodiments, the one or more sensors 352 may further be configured to communicate (e.g., wirelessly) to a control system (not shown) that is, in turn, configured to control the operation of components of system 300 in response to the parameters detected by the one or more sensors 352. For example, the control system in some embodiments may rely on feedback from the one or more sensors 352 in order to operate and/or maintain certain components of system 300 at predetermined ranges temperatures and/or pressures. Extruder speeds, temperature control systems, and/or other components may be adjusted by the control system.

As described herein, the foams manufactured in accordance with embodiments of the present disclosure may be useful in a variety of industries and end products, for example, but not limited to, footwear components (e.g., shoe insoles or midsoles), seating components, protective gear components, vehicle components, bedding materials, and watersport accessories. In some embodiments, the extruded foams of the present disclosure may be formed in a variety of predetermined dimensions (e.g., thicknesses, lengths, widths), depending on the intended application. In further embodiments, the extruded foams may subsequently be cut or shaped (e.g. via compression molding) for forming foam pieces useful for making the end products. For example, a sheet of a biodegradable and/or recyclable foam made in accordance with embodiments of the present disclosure may be die-cut into a usable piece that may be referred to as a "blocker." The blocker may then be compression molded to form, for instance, a contoured footwear midsole for use in assembling shoes or other footwear.

Because foams according to certain embodiments are made from recycled, recyclable, biodegradable, and/or compostable materials, without cross-linking, the foams offer an environmentally-friendly alternative to conventional foam materials (e.g., EVA or TPU foams). At the end of the foam's usable life, the foam can either be optionally biodegraded or composted, in the case of the biodegradable foam, or be recycled and reprocessed (e.g., into new foam) in the case of a recyclable foam. In some embodiments, the foams can be depolymerized back into useable pre-cursor ingredients (e.g., monomers), thanks to the lack of crosslinking agents or other impeding chemical additives.

It should be understood that various changes, substitutions, and alterations can be made herein without departing from the spirit and scope of the invention as defined by the appended claims. It should also be apparent that individual elements identified herein as belonging to a particular embodiment may be included in other embodiments of the invention. Moreover, the scope of the present application is not intended to be limited to the particular embodiments of the process, machine, manufacture, and composition of matter, means, methods and steps described in the specification. As one of ordinary skill in the art will readily appreciate from the disclosure herein, processes, machines, manufacture, composition of matter, means, methods, or steps, presently existing or later to be developed that perform substantially the same function or achieve substantially the same result as the corresponding embodiments described herein may be utilized according to the present invention.

What is claimed is:

1. A process for producing a foam, the process comprising:
   introducing a masterbatch material into an extruder, the masterbatch material consisting essentially of one or more thermoplastic polymers that are recycled, recyclable, biodegradable, and/or compostable;
   mixing an inert gas with the masterbatch material prior to introducing the masterbatch material into the extruder, wherein the masterbatch material comprises pellets of the one or more thermoplastic polymers, and wherein mixing the inert gas with the masterbatch material comprises infusing the inert gas into the pellets of the one or more thermoplastic polymers;
   extruding the masterbatch material through the extruder to form a polymer melt;
   passing the polymer melt through a die to form an extrudate; and
   allowing the extrudate to expand into a foam.

2. The process of claim 1, wherein the inert gas is carbon dioxide.

3. The process of claim 1, wherein the inert gas is nitrogen.

4. The process of claim 1, wherein the one or more thermoplastic polymers comprises a polyamide or a polyamide copolymer.

5. The process of claim 1, wherein the one or more thermoplastic polymers comprises a polyamide selected from the group consisting of: polyether block amide (PEBA), polyamide 6, polyamide 6/6-6, polyamide 12, or a blend containing one or more thereof.

6. The process of claim 1, wherein the one or more thermoplastic polymers comprises a polyesters or a polyester copolymer.

7. The process of claim 1, wherein the one or more thermoplastic polymers comprises a polymer selected from the group consisting of: polybutylene adipate terephthalate (PBAT), polylactic acid (PLA), poly(L-lactic acid) (PLLA), poly(butylene adipate-co-terephthalate) (PBAT), polycaprolactone (PCL), polyhydroxy alkanoate (PHA), polyhydroxybutyrate (PHB), polybutylene succinate (PBS), polybutylene succinate adipate (PBSA), polybutylene adipate (PBA), thermoplastic starch (TPS), and a blend containing one or more thereof.

8. The process of claim 1, wherein the one or more thermoplastic polymers comprises one or more recycled polymer materials.

9. The process of claim 1, wherein the one or more thermoplastic polymers comprises of one or more bio-derived polymers.

10. The process of claim 9, wherein the one or more bio-derived polymers comprises a bio-derived PBAT.

11. The process of claim 1, wherein the inert gas is mixed with the masterbatch material as a supercritical fluid.

12. The process of claim 1, wherein infusing the inert gas into the pellets of the one or more thermoplastic polymers causes the pellets of the one or more thermoplastic polymers to expand, forming expanded pellets of the one or more thermoplastic polymers.

13. The process of claim 12, wherein extruding the masterbatch material through the extruder to form a polymer melt comprises fusing the expanded pellets of the one or more thermoplastic polymers.

14. The process of claim 7, wherein the one or more thermoplastic polymers consists of PBAT.

15. The process of claim 1, wherein mixing an inert gas with the masterbatch material comprises saturating the pellets of the one or more thermoplastic polymers with the inert gas at a saturation pressure from 75 bar to 200 bar.

16. The process of claim 1, further comprising adding one or more binding agents to the masterbatch material.

17. The process of claim 16, wherein the one or more binding agents are added to the masterbatch material in the extruder.

18. The process of claim 12, wherein the expanded pellets have a bulk density of about 100 kg/m$^3$ to about 200 kg/m$^3$.

19. The process of claim 1, wherein the foam has a density from 0.15 g/cc to 0.35 g/cc.

* * * * *